Figure 1:
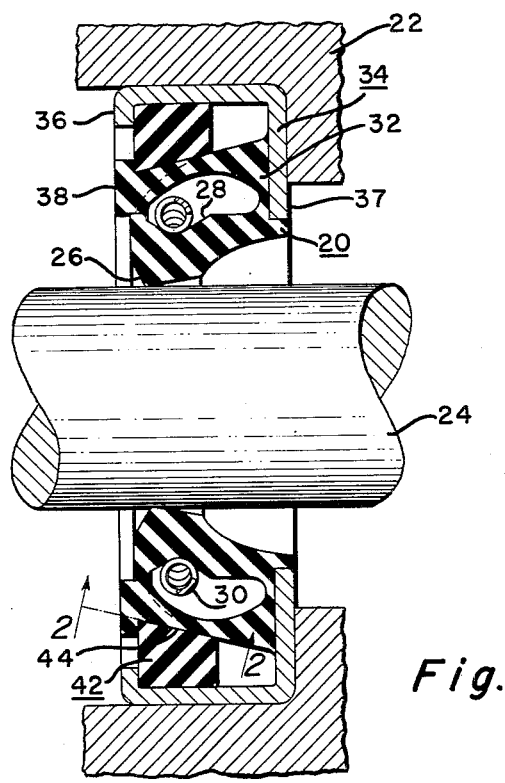

May 27, 1958     E. F. RIESING     2,836,450

FLUID SEAL

Original Filed Dec. 5, 1952

INVENTOR.
Ellwood F. Riesing
BY John R. Mauvin
His Attorney

United States Patent Office 2,836,450
Patented May 27, 1958

2,836,450

FLUID SEAL

Ellwood F. Riesing, Dayton, Ohio, assignor to General Motors Corporation, Detroit, Mich., a corporation of Delaware Original application December 5, 1952, Serial No. 324,326, now Patent No. 2,768,849, dated October 30, 1956. Divided and this application February 8, 1956, Serial No. 564,182

4 Claims. (Cl. 288—3)

This invention relates to fluid seals and is particularly concerned with fluid seals of the radial type which include guard rings.

This case is a division of application Ser. No. 324,326 filed December 5, 1952, now U. S. Patent No. 2,768,849.

It is an object of the present invention to provide a fluid seal in connection with a rotating member wherein the seal is held within a cavity of a housing member and seals preferably around the rotating member through the conjoint action of the resilient material used in the seal and a garter type spring used to increase the radial pressure against the rotating member, an integral guard ring being provided in connection with the seal for enclosing and for protecting the spring during use of the seal.

A further object of the present invention is to provide a fluid seal of the type described in the aforegoing object wherein the guard ring is forced into closed relation with another portion of the seal through the use of an annular locking ring.

Further objects and advantages of the present invention will be apparent from the following description, reference being had to the accompanying drawing, wherein preferred embodiments of the present invention are clearly shown.

Figure 2:
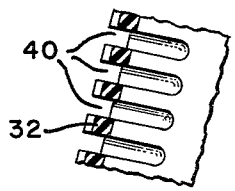

In the drawing:

Figure 1 shows a cross section of one type of seal as described herein utilizing a guard ring; and Figure 2 is a view taken on line 2—2 of Figure 1.

Radial type seals of varying designs are disclosed in my copending applications, Serial Nos. 324,324, 324,325 and 324,327. In these applications, seals are shown which include reinforcing members for holding the shape of the seal and which also include a garter spring for improving the sealing properties of the assembly when installed between a housing and a shaft.

The present invention is directed to a radial type seal wherein a guard ring is utilized which is molded integrally with the body of the seal and which may or may not be in direct contact with the garter spring.

The function of this guard ring is to prevent the garter spring from becoming displaced from its positioning groove in the sealing lip. Such a condition often arises through vibration or unbalance of the rotating member whereby inertia forces either alone or in conjoint action, cause the spring to become displaced from its receiving groove. When this occurs, the sealing value of the entire unit is markedly reduced.

The guard ring has another very useful function in that it prevents the ingress of dirt, mud or abrasive materials into the garter spring receiving groove whereby the efficiency of the garter spring is maintained high due to the elimination of extraneous and deleterious materials.

In the past, the function of a guard ring has been obtained through the inclusion of a metal ring which snaps into the seal assembly and which, in many cases, does a satisfactory sealing job but which, in others, due to distortion or vibration thereof, fails to perform the desired function and which, due to its rigidity, often reduces the efficiency of the seal.

Referring specifically to Fig. 1, an embodiment of this structure is shown wherein a seal 20 is provided between a housing 22 and a rotatable shaft 24. The seal 20 includes a sealing lip 26 having a groove 28 of annular shape therearound which receives a garter spring 30 that radially compresses the lip 26 into sealing engagement with the shaft. The main body 32 of the seal is bonded to an annular metallic retainer 34 which is of generally U-shaped cross-section and which includes a short inturned lip 36 and a longer lip 37 in opposed relation thereto. The body 32 of the seal 20 also includes an elongated flexible lip 38 which is grooved as shown in Fig. 2 to include a plurality of spaced grooves 40. The grooves 40 permit the lip 38 to be capable of smooth, radial compression inwardly so as to eventually close the cavity in the seal 20 which includes the garter spring 30. The sealed position is shown in Fig. 1.

In order to hold the lip 38 in contact with that portion of the seal adjacent the groove 28, an annular snap ring 42 is provided which has an angled face 44 thereon that becomes contiguous with the outer surface of the lip 38 when the seal is in the position shown in Fig. 1. The snap ring 42 is snapped past the inturned flange 36 and thereby seals the garter spring against deleterious materials seeping or creeping into the spring groove 28. It is noted that the metallic seal retainer 34 is a press fit within the housing 22.

It is apparent that the seal described herein may be made from any suitable elastomeric material wherein the seal has sufficient resiliency to permit proper insertion and proper sealing functions. Butadiene-acrylonitrile copolymers, polyacrylates, polychloroprene, butadiene-styrene copolymers, natural rubber and mixtures thereof may all be used compatible with the application of the seal. In other words, if the seal is to be used to prevent grease or oil from seeping along the shaft, it is important that the material used therein be resistant against destruction by such materials. On the other hand, if the seal is used to prevent the migration of water or aqueous solutions, natural rubber provides a very satisfactory material. It is to be understood that my invention is in no way limited to the specific material used within the seal and that in this instance any suitable elastomeric compound will be satisfactory.

While the embodiments of the present invention as herein disclosed, constitute preferred forms, it is to be understood that other forms might be adopted.

What is claimed is as follows:

1. A fluid seal of the radial type adapted to seal a rotatable member from a non-rotatable member, the combination comprising: a supporting cup having an annular side wall and an annular base portion adapted to be supported by the non-rotatable member; an annular elastomeric body member bonded to the base of said supporting cup; an elastomeric annular, axially elongated flexible portion carrying a sealing lip adapted to sealingly engage said rotatable member and having an external annular groove for supporting a garter spring, integrally attached to said body portion and extending axially within said supporting cup; an axially elongated guard ring concentric with said sealing lip portion and spaced therefrom and said supporting cup wall, integrally attached to the said body member; a locking ring interposed between said supporting cup wall and said guard ring whereby the guard ring is radially compressed into engagement with said sealing lip carrying portion providing an enclosed annular space therebetween enclosing said annular groove; and a garter spring within said annular groove encircling said sealing lip carrying portion adapted to urge said sealing lip into sealing engagement with the rotatable member.

2. The seal claimed in claim 1 wherein the guard ring has a plurality of grooved portions spaced radially therearound for increasing the radial compressibility of said ring and for preventing buckling thereof.

3. The seal claimed in claim 1 wherein the guard ring and retaining cup have radial projections extending toward each other for holding said locking ring locked in place.

4. The seal claimed in claim 3 wherein the locking ring has an angled face in contiguous engagement with said guard ring.

References Cited in the file of this patent

UNITED STATES PATENTS

| 2,316,941 | Dodge | Apr. 20, 1943 |
| 2,397,847 | Dodge | Apr. 2, 1946 |
| 2,651,534 | Kosatka | Sept. 8, 1953 |

FOREIGN PATENTS

| 556,441 | Great Britain | Oct. 5, 1943 |
| 708,917 | Germany | July 31, 1941 |